US011990303B1

(12) United States Patent
Worsham

(10) Patent No.: US 11,990,303 B1
(45) Date of Patent: May 21, 2024

(54) TESTABLE THERMAL CIRCUIT BREAKER

(71) Applicant: David Worsham, Santa Rosa Beach, FL (US)

(72) Inventor: David Worsham, Santa Rosa Beach, FL (US)

( * ) Notice: Subject to any disclaimer, the term of this patent is extended or adjusted under 35 U.S.C. 154(b) by 0 days.

(21) Appl. No.: 18/075,600

(22) Filed: Dec. 6, 2022

(51) Int. Cl.
*H01H 37/52* (2006.01)
*H01H 37/74* (2006.01)
*H01H 71/08* (2006.01)
*H01H 71/12* (2006.01)
*H01H 71/58* (2006.01)

(52) U.S. Cl.
CPC .......... *H01H 71/128* (2013.01); *H01H 37/52* (2013.01); *H01H 37/74* (2013.01); *H01H 71/08* (2013.01); *H01H 71/58* (2013.01)

(58) Field of Classification Search
CPC ...... H01H 71/128; H01H 37/52; H01H 37/74; H01H 71/08; H01H 71/58
USPC .................................................... 337/68, 298
See application file for complete search history.

(56) References Cited

U.S. PATENT DOCUMENTS 4,068,203 A * 1/1978 Unger .................. H01H 73/303 337/91
4,157,524 A * 6/1979 Lamarche ............ H01H 73/303 337/64
4,363,016 A * 12/1982 Unger .................. H01H 73/303 337/91
4,379,278 A * 4/1983 Kuczynski ........... H01H 73/303 337/91
4,528,538 A * 7/1985 Andersen ............... H01H 73/26 337/2
4,833,439 A * 5/1989 Bowden ................. H01H 73/26 337/91
4,868,535 A * 9/1989 Janniere ................. H01H 71/46 337/91
5,157,369 A * 10/1992 Yao ...................... H01H 73/303 337/68
5,248,954 A * 9/1993 Chiang ................ H01H 73/303 337/91
5,694,106 A * 12/1997 Wang ................ H01L 21/67109 337/72

(Continued)

OTHER PUBLICATIONS

2023 TE Connectivity Ltd.; Relays, Contactors & Switches>Circuit Breakers; catalog, 6 pages.

*Primary Examiner* — Anatoly Vortman
(74) *Attorney, Agent, or Firm* — Lanier Ford Shaver & Payne, PC; Gerald M. Walsh

(57) ABSTRACT

A thermal breaker having a push rod positioned in a base of the thermal breaker between a first terminal and a second terminal and beneath an electrical conducting element. A first end of the electrical conducting element is fixed to and makes electrical contact with the first terminal and a second opposite end extends to the second terminal and is constructed to make reversible electrical contact with the second terminal. A spacer extends from the push rod and is positioned in between the second end and the second terminal when the push rod is pushed manually towards a rear end of the base, preventing electrical conductivity between the first terminal and the second terminal. Releasing the push rod restores electrical conductivity between the first terminal and the second terminal as a spring pushes the push rod towards a front end of the base.

12 Claims, 6 Drawing Sheets

(56) References Cited

U.S. PATENT DOCUMENTS

| | | | | | |
|---|---|---|---|---|---|
| 5,742,219 | A * | 4/1998 | Moalem | H01H 73/303 337/91 |
| 5,783,986 | A * | 7/1998 | Huang | H01R 13/7137 337/333 |
| 5,854,585 | A * | 12/1998 | Kingma | H01H 37/5409 337/365 |
| 5,936,505 | A * | 8/1999 | Yu | H01H 73/26 337/345 |
| 6,377,158 | B1 * | 4/2002 | Yu | H01H 73/303 337/112 |
| 6,563,414 | B2 * | 5/2003 | Yu | H01H 73/303 337/112 |
| 6,707,368 | B2 * | 3/2004 | Alfaro | H01H 73/303 337/72 |
| 7,026,906 | B2 * | 4/2006 | Huang | H01H 73/26 337/91 |
| 7,230,516 | B2 * | 6/2007 | Yu | H01H 73/303 337/66 |
| 7,336,149 | B2 * | 2/2008 | Ullermann | H01H 73/303 337/79 |
| 7,683,750 | B1 * | 3/2010 | Yu | H01H 73/14 337/79 |
| 2002/0153990 | A1 * | 10/2002 | Yu | H01H 73/303 337/333 |
| 2006/0176141 | A1 * | 8/2006 | Yu | H01H 73/303 337/66 |

* cited by examiner

TESTABLE THERMAL CIRCUIT BREAKER

FIELD OF THE DISCLOSURE

The circuit breaker of this disclosure is related to thermal circuit breakers and, more particularly, to thermal breakers that are testable for electrical conductivity.

BACKGROUND OF THE DISCLOSURE

Thermal circuit breakers are ideally suited for overload protection of motors, transformers, magnetic valves, and on-board electrical systems on watercraft. Push button resettable thermal circuit breakers are known. Some of them have an electrically conducting element that connects a ground terminal electrically to a load terminal. The electrically conducting element at one end is fixed to the ground terminal and at an opposite end it makes electrical contact with the load terminal but is not fixed to the load terminal. The electrically conducting element is a bi-metal that bends away from the load terminal when it gets hot, for example from an overload, so that there is no longer an electrical connection between the ground terminal and the load terminal. When the electrically conducting element is bent away from the load terminal a space is created between the electrically conducting element and the load terminal. In this configuration, a spring pushes a push rod in a direction that inserts a spacer in the space between the load terminal and the electrically conducting element. The thermal breaker is reset by pushing the push rod in the opposite direction to remove the spacer, allowing the element to make contact with the load terminal, after the filament is cooled and regained its original shape.

It is customary that many of these thermal breakers, for example 10-30 thermal breakers, may be used in a single electrical system. Input and output electrical wires of these thermal breakers may all be bound together. If there is a need to verify electrical connectivity between a thermal breaker and the device that it protects, it may be necessary to unbundle and isolate all the wires, which is time consuming and impractical. What is needed is a simple way to test electrical connectivity between a thermal breaker and the device that it protects.

SUMMARY

The thermal breaker of this disclosure has a push rod positioned in a base of the thermal breaker between a first terminal and a second terminal and beneath an electrical conducting element. The base has a front end and a rear end, the push rod has a front end and a rear end, and the electrical conducting element has a first end and a second end opposite the first end. The first end is fixed to and makes electrical contact with the first terminal and the second end extends to the second terminal and is constructed to make reversible contact with the second terminal. A spacer extends from the push rod and is positioned in between the second end and the second terminal when the push rod is pushed manually towards the rear end of the base.

There is no electrical conductivity between the first terminal and the second terminal when the spacer is positioned between the second end and the second terminal. The spacer is removed from in between the second end and the second terminal when the push rod is pushed by a spring towards the front end of the base. There is electrical conductivity between the first terminal and the second terminal when the spacer is removed from in between the second end and the second terminal. The spacer is, preferably, in the shape of a wedge.

An advantage of the thermal breaker of this disclosure is that it can test for electrical conductivity between the thermal breaker and the device that it protects.

Another advantage is that the test can be made easily by pushing the push rod down momentarily.

Another advantage is that only a simple modification of an existing type of thermal breaker is needed.

DETAILED DESCRIPTION OF THE DISCLOSURE

While the following description details certain embodiments of a testable thermal circuit breaker, it is to be understood that the disclosure is not limited in its application to the details in the description of the testable thermal circuit breaker, since the testable thermal circuit breaker of this disclosure is capable of other embodiments and of being practiced in various ways.

Figure 1A:
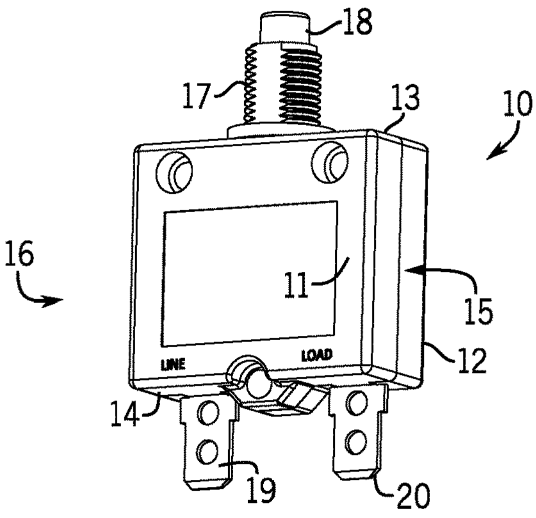
FIG. 1A is top, left side perspective view of a push-button testable thermal breaker of this disclosure in an “on” position.
Figure 1B:
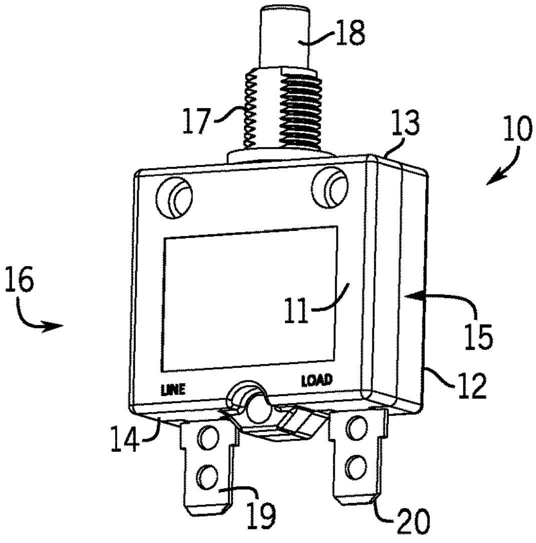
FIG. 1B shows the push button testable thermal breaker of FIG. 1A in an “off” position as a result of a thermal overload.
Figure 1C:
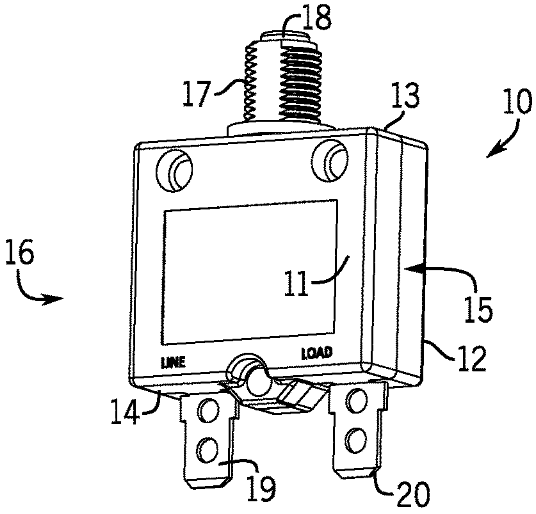
FIG. 1C shows the thermal breaker of FIG. 1A in a “test” position as a result of pushing the push button down.

FIG. 1A is top, left side perspective view of a push-button testable thermal breaker 10 of this disclosure in a “on” position. The thermal breaker 10 has a top cover 11, and bottom base 12, a front end 13, a rear end 14, a left side 15, and a right side 16. A retaining member 17 holds a push button 18 in position. A first electrical terminal 19 and a second electrical terminal 20 extend from the bottom base 12. The terminals 19 and 20 are electrically connected in the "on" position. FIG. 1B shows the thermal breaker of FIG. 1A in an "off" position because of a thermal overload. The terminals 19 and 20 are not electrically connected in the "off" position. In the "off" position the push button 18 is extended upward. When the thermal breaker 10 cools down from the thermal overload the pushbutton 18 can be pushed down to the "on" position to reset the thermal breaker 10. FIG. 1C shows the thermal breaker 10 in a "test" position as a result of pushing the push button 18 down from the "on" position and holding the push button 18 down. The terminals 19 and 20 are not electrically connected in the "test" position. The thermal breaker 10 will reset to the "on' position when the push button 18 is released.

Figure 2:
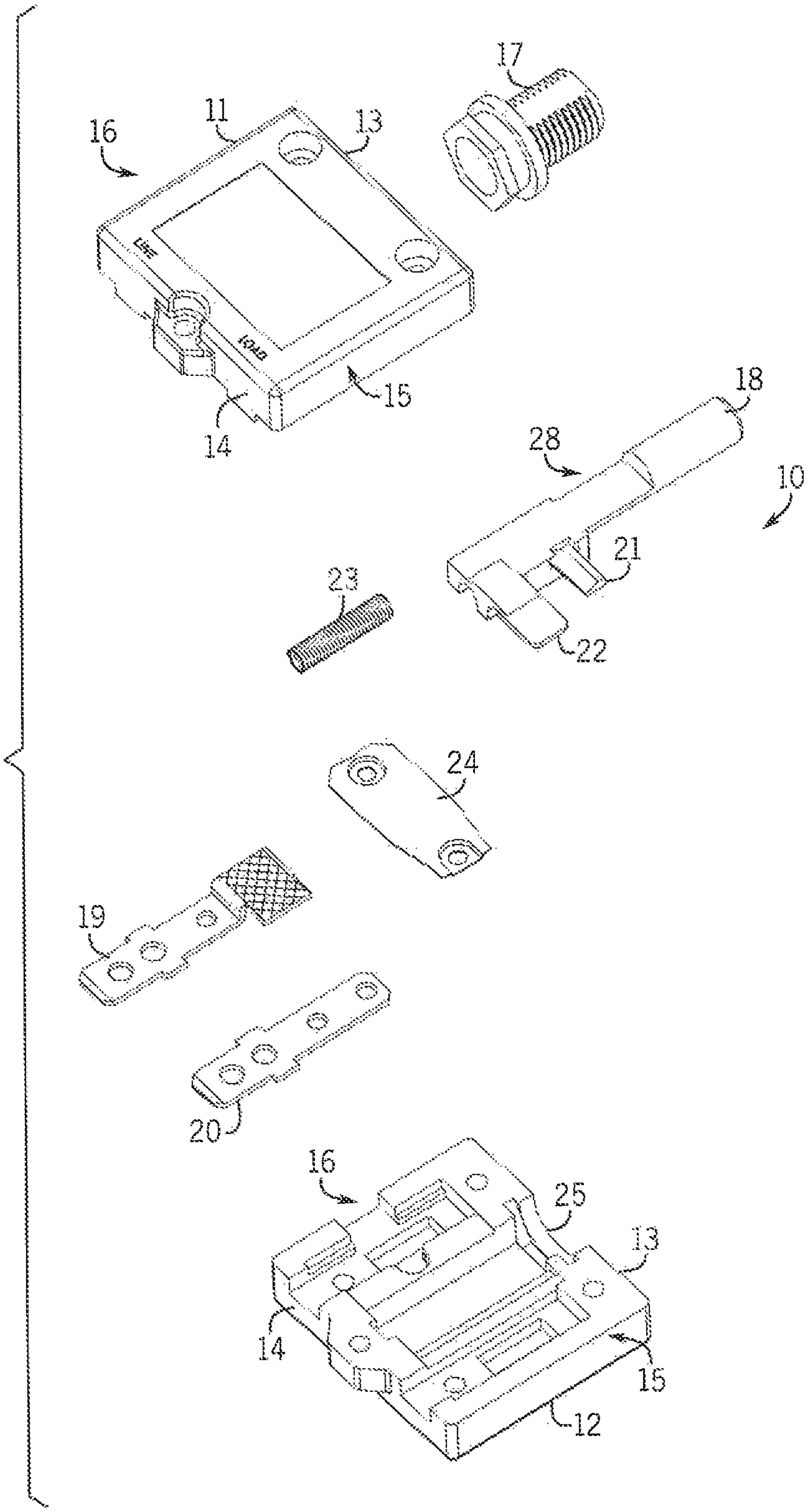
FIG. 2 shows the thermal breaker of FIG. 1 in a disassembled configuration.
Figure 3:
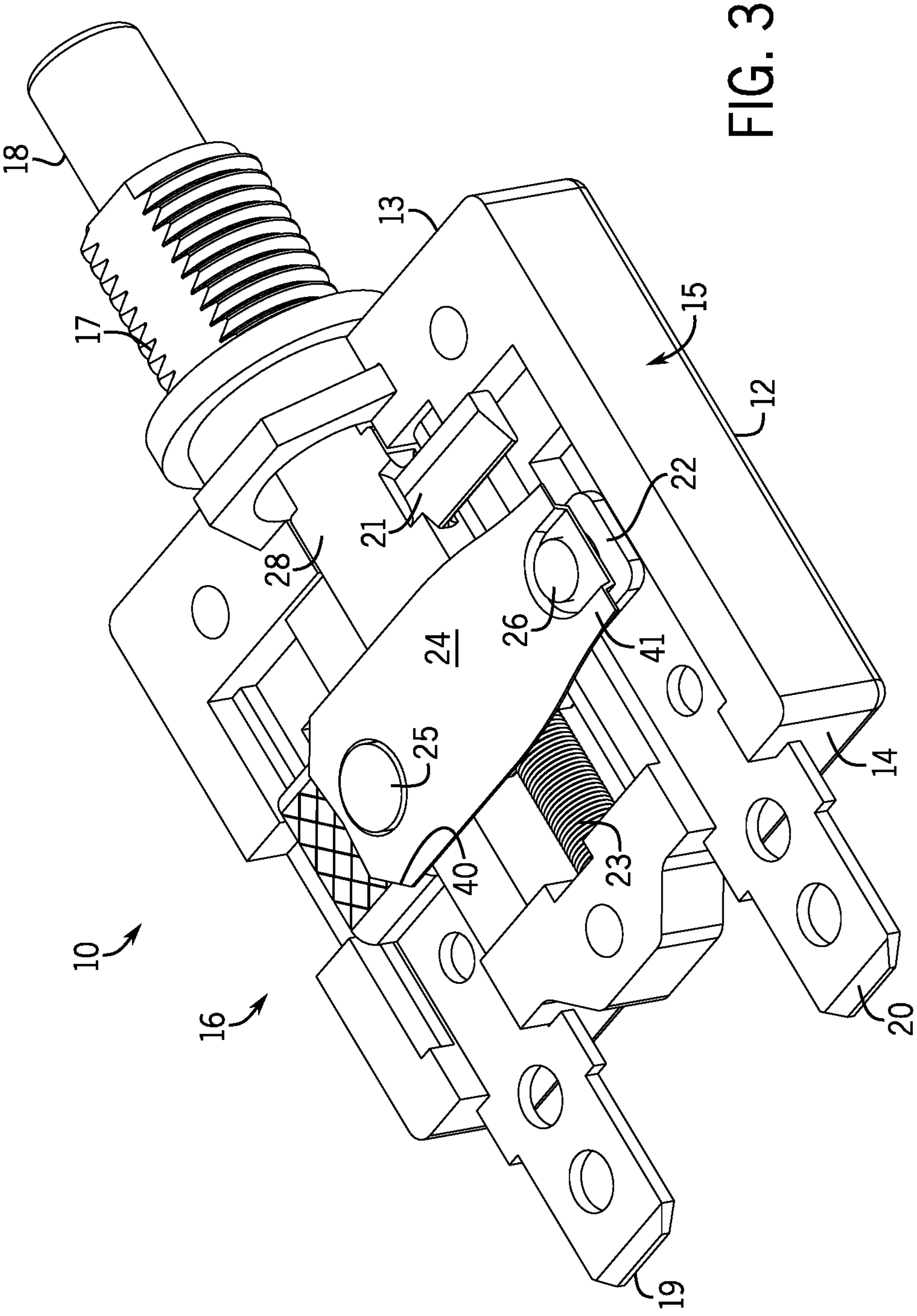
FIG. 3 shows the thermal breaker of FIG. 1 with a top cover removed.

FIG. 2 shows the thermal breaker 10 in a disassembled configuration. FIG. 3 shows the thermal breaker 10 with a top cover 11 removed. The push rod 28 is positioned centrally in the base 12 between the first terminal 19 and the second terminal 20. An electrical conducting element 24, preferably made of bimetal, is positioned over the push rod 28 and is attached at a first end 40 to terminal 19 by a fastener 25. A second end 41 of the electrical conducting element 24 is in electrical contact with terminal 20. The second end 41 of the electrical conducting element 24 has a contact element 26 that makes electrical contact with terminal 20 when the thermal breaker is in an "on" position. A spring 23 at a rear end of the push rod 28 biases the push rod upwards towards the front end 13 of the thermal breaker 10. In FIG. 3 the thermal breaker 10 is in the "off" position resulting from a thermal overload. When the electrical conducting element 24 gets hot it bends upwards because of its bimetal characteristics by methods known in the art. When that occurs the spring 23 can push the push rod 28 upward and insert the spacer 22 under the contact element 26. In that configuration the contact element 26 cannot contact the terminal 20, electric current cannot flow through the conducting element 24, and the thermal breaker 10 is off.

Figure 4:
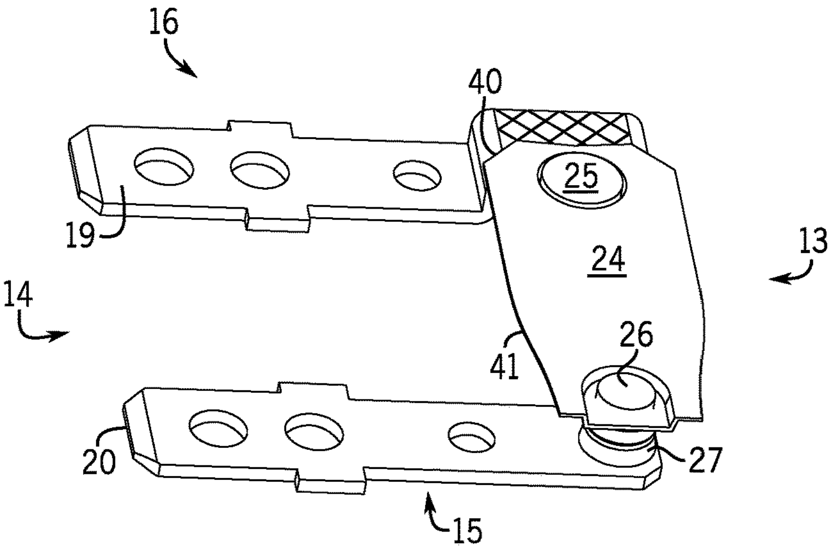
FIG. 4 shows a top, left side perspective view of first and second terminals of the thermal breaker making electrical contact with an electrically conducting element.
Figure 5:
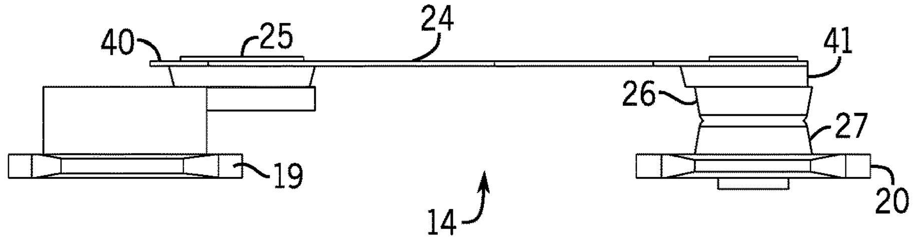
FIG. 5 shows a rear end elevation view of the first and second terminals making electrical contact with an electrically conducting element.

FIG. 4 shows a top, left side perspective view of first 19 and second 20 terminals of the thermal breaker 10 making electrical contact with the electrically conducting element 24. The electrically conducting element 24 is fixed to terminal 19 with a fastener 25 and makes electrical contact with terminal 19. The contact element 26 on the conducting element 24 makes electrical contact with the contact element 27 on terminal 20 but is not fixed to terminal 20. Contact element 26 will separate from contact element 27 when the conducting element 24 gets hot in a thermal overload and bends upward, lifting contact element 26 upward. FIG. 5 shows a rear end elevation view of the first 19 and second 20 terminals making electrical contact with the electrically conducting element 24.

Figure 6:
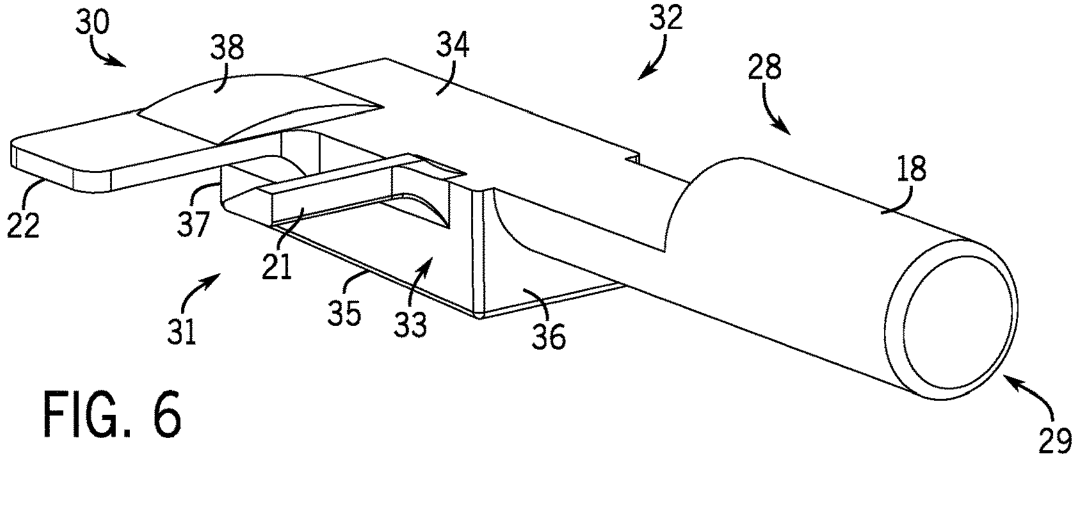
FIG. 6 shows a top, front, and left perspective view of a push rod of the thermal breaker.
Figure 7:
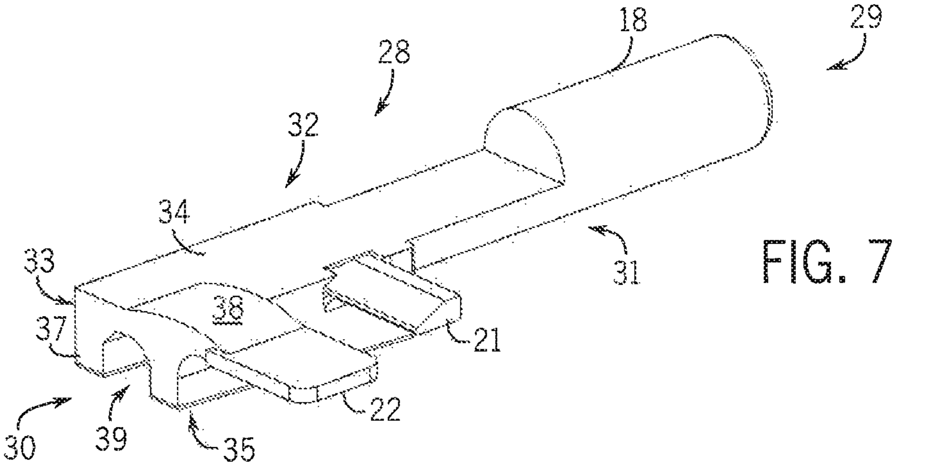
FIG. 7 shows a top, rear, and left perspective view of the push rod.
Figure 8:
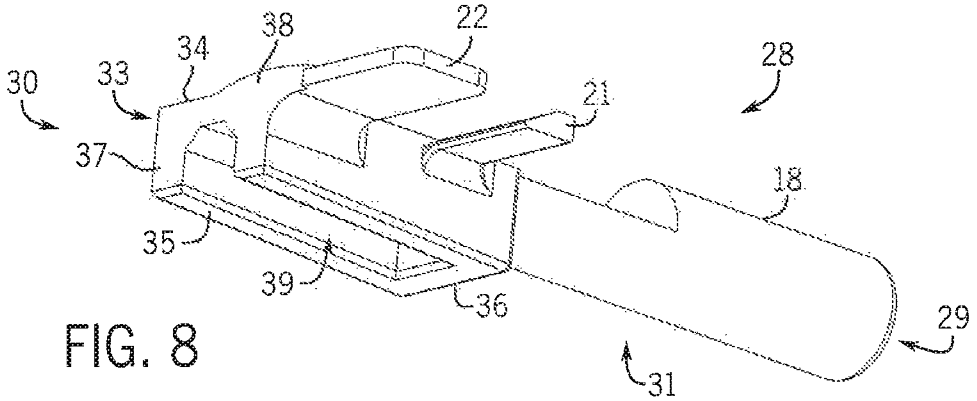
FIG. 8 shows a bottom, rear, and left perspective view of the push rod.

FIG. 6 shows a top, front, and left perspective view of a push rod 28 of the thermal breaker 10. The push rod 28 has a front end 29, a rear end 30, a left side 31 and a right side 32. A push button 18 is at the front end 29 and a spring housing 33 is at the rear end 30. The spring housing 33 has a top 34, a bottom 35, a front end 36, and a rear end 37. A spacer member 21 in the shape of a wedge and a spacer 22 extend from the left side 31 of the housing 33 near the top 34 of the housing 33. The housing 33 has a stopper member 38 on the top 34 of the housing 33 which may extend onto the spacer member 22. FIG. 7 shows a top, rear, and left perspective view of the push rod 28. FIG. 8 shows a bottom, rear, and left perspective view of the push rod 28. FIGS. 7 and 8 further show the interior 39 of the housing 33 for containing the spring 23.

Figure 9:
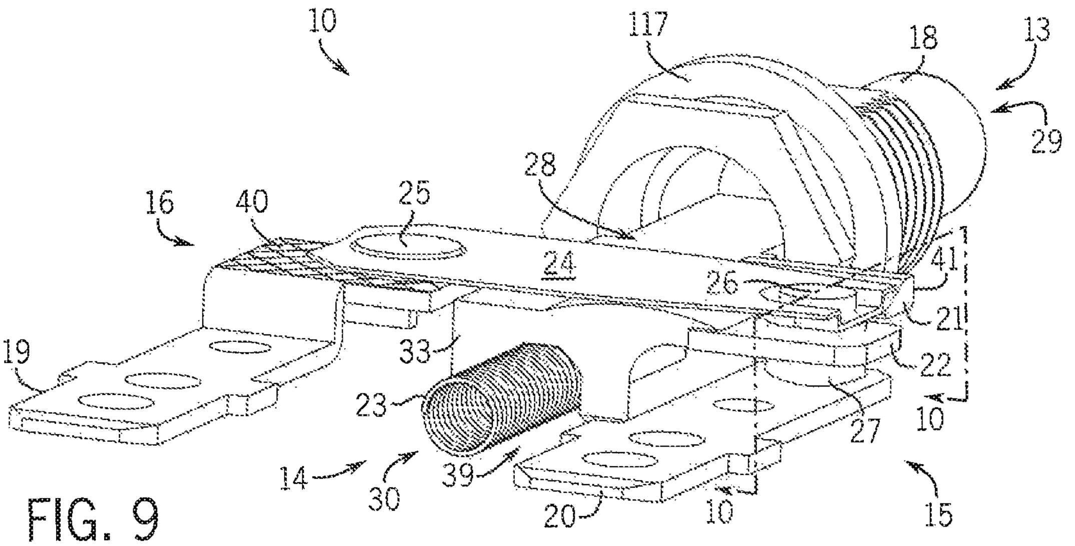
FIG. 9 shows a rear, top, and perspective view of the push rod positioned between the first and second terminals in an “off” position, produced by a thermal overload.

FIG. 9 shows a rear, top, and perspective view of the push rod 28 positioned between the first 19 and second 20 terminals in an "off" position, produced by a thermal overload. FIG. 9 further shows the spring 23 in position in the interior 39 of the housing 33 of the push rod 28. FIG. 9 also shows the spacer member 22 positioned between the electrical contact 26 on the electrical conducting element 24 and the electrical contact 27 on the second terminal 20, and the stopper 38 on the top 34 of the housing 33 positioned under the electrical conducting element 24. When the thermal breaker 10 is in the "on" position, the front edge of the stopper 38 engages the rear edge of the electrical conducting element 24, and the push rod 28 and its stopper 38 cannot move forward to the front 13 of the thermal breaker 10. When there is a thermal overload in the thermal breaker 10 and the electrical conducting element 24 bends upward, the stopper 38 can pass under the electrical conducting element 24 and the spring 23 pushes the push rod 28 to the off position. When the spacer 22 is between the electrical contact 26 and the electrical contact 27 there is no electrical connection between the first terminal 19 and the second terminal 20.

Figure 10A:
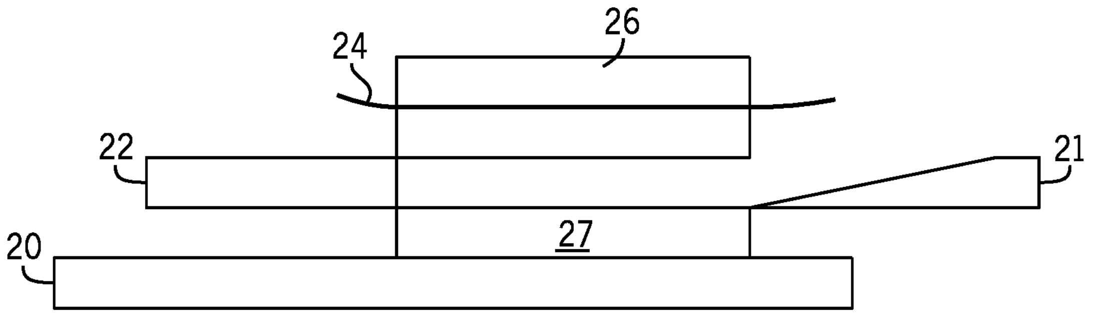
FIG. 10A is a left side sectional illustration along line 10-10 in FIG. 9 showing the contacts of the thermal breaker in an “on” position.

FIG. 10A is a left side sectional illustration along line 10-10 in FIG. 9, showing the electrical contact 26 making an electrical connection with electrical contact 27 on terminal 20. The thermal breaker 10 is in an "on" position.

Figure 10B:
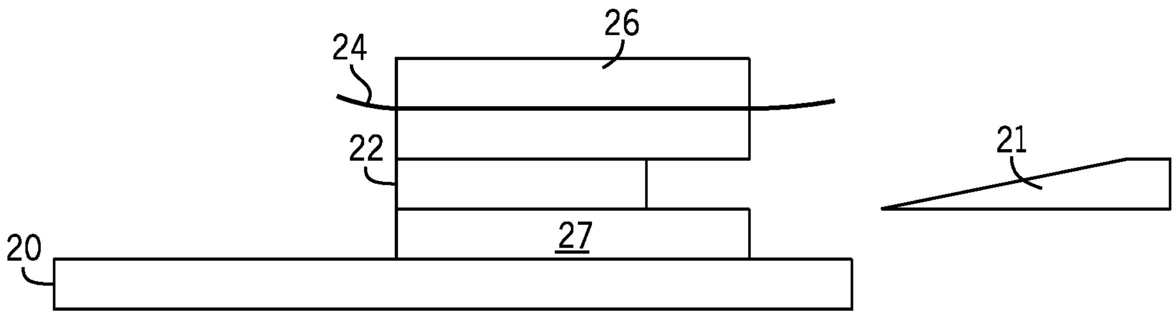
FIG. 10B is a left side sectional illustration along line 10-10 in FIG. 9 showing the contacts of the thermal breaker in an “off” position because of a thermal overload.

FIG. 10B shows the thermal breaker 10 in an "off" position because of a thermal overload. The electrical conducting element 24 has bent upward, the spacer member 22 has been pushed between the electrical contacts 26 and 27 by action of the spring 23, and the spacer member 21 engages the front cover 11.

Figure 10C:
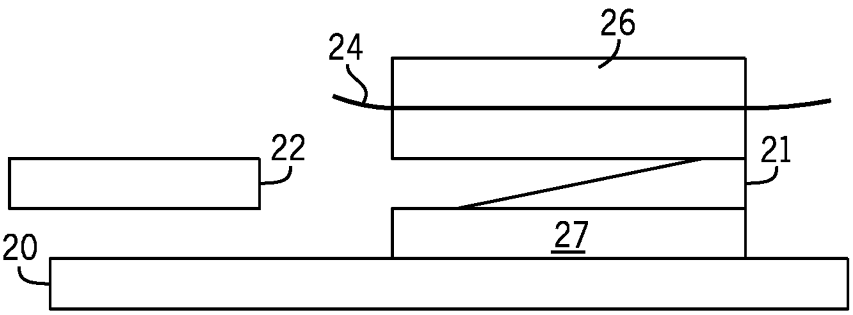
FIG. 10C is a left side sectional illustration along line 10-10 in FIG. 9 showing the contacts of the thermal breaker in an “off” position because of pushing the push button down to test the function of the thermal breaker.

FIG. 10C shows the electrical contacts 26 and 27 of the thermal breaker 10 in a "test" position when the push button 18 is pushed down towards the rear end 14 of the thermal breaker 10 to temporarily turn the thermal breaker 10 off. When the push button 18 is pushed down the spacer member 21 on the push rod 28 is forced between the electrical contacts 26 and 27 by a wedging action, forcing the electrical contacts 26 and 27 to separate. When the push button 18 is released, the spring 23 forces the push rod 28 and push button 18 upward towards the front 13 of the thermal breaker 10, taking the spacer member 21 out from between the electrical contacts 26 and 27 and the thermal breaker 10 is turned back on. When the spacer member 21 is between the electrical contact 26 on the electrical conducting element 24 and the electrical contact 27 on the second terminal 19, there is no electrical connection between the first terminal 19 and the second terminal 20.

The foregoing description illustrates and describes the disclosure. Additionally, the disclosure shows and describes only the preferred embodiments but, as mentioned above, it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art. The embodiments described herein above are further intended to explain the best modes known by applicant and to enable others skilled in the art to utilize the disclosure in such, or other, embodiments and with the various modifications required by the particular applications or uses thereof. Accordingly, the description is not intended to limit the thermal breaker to the form disclosed herein. Also, it is intended that the appended claims be construed to include alternative embodiments.

What is claimed is:

1. A thermal breaker, comprising:

a) a push rod positioned in a base of the thermal breaker between a first terminal and a second terminal and beneath an electrical conducting element, the base having a front end and a rear end, the push rod having a front end and a rear end, and the electrical conducting element having a first end and a second end opposite the first end;

b) the first end fixed to and making electrical contact with the first terminal and the second end extending to the second terminal and constructed to make reversible contact with the second terminal; and c) a spacer extending from the push rod and positioned in between the second end and the second terminal when the push rod is pushed manually towards the rear end of the base.

2. The thermal breaker of claim 1, wherein there is no electrical conductivity between the first terminal and the second terminal when the spacer is positioned between the second end and the second terminal.

3. The thermal breaker of claim 1, wherein the spacer is removed from in between the second end and the second terminal when the push rod is pushed by a spring towards the front end of the base.

4. The thermal breaker of claim 1, wherein there is electrical conductivity between the first terminal and the second terminal when the spacer is removed from in between the second end and the second terminal.

5. The thermal breaker of claim 1, wherein the spacer is in the shape of a wedge.

6. A thermal breaker, comprising:

a) a push rod positioned in a base of the thermal breaker between a first terminal and a second terminal and beneath an electrical conducting element, the base having a front end and a rear end, the push rod having a front end and a rear end, and the electrical conducting element having a first end and a second end opposite the first end;

b) the first end fixed to and making electrical contact with the first terminal and the second end extending to the second terminal and constructed to make reversible contact with the second terminal; and c) a spacer extending from the push rod and positioned in between the second end and the second terminal when the push rod is pushed manually towards the rear end of the base, wherein there is no electrical conductivity between the first terminal and the second terminal when the spacer is positioned between the second end and the second terminal.

7. The thermal breaker of claim 6, wherein the spacer is removed from in between the second end and the second terminal when the push rod is pushed by a spring towards the front end of the base.

8. The thermal breaker of claim 6, wherein there is electrical conductivity between the first terminal and the second terminal when the spacer is removed from in between the second end and the second terminal.

9. The thermal breaker of claim 6, wherein the spacer is in the shape of a wedge.

10. A thermal breaker, comprising:

a) a push rod positioned in a base of the thermal breaker between a first terminal and a second terminal and beneath an electrical conducting element, the base having a front end and a rear end, the push rod having a front end and a rear end, and the electrical conducting element having a first end and a second end opposite the first end;

b) the first end fixed to and making electrical contact with the first terminal and the second end extending to the second terminal and constructed to make reversible contact with the second terminal; and c) a spacer extending from the push rod and positioned in between the second end and the second terminal when the push rod is pushed manually towards the rear end of the base, wherein there is no electrical conductivity between the first terminal and the second terminal when the spacer is positioned between the second end and the second terminal, and wherein the spacer is removed from in between the second end and the second terminal when the push rod is pushed by a spring towards the front end of the base.

11. The thermal breaker of claim 10, wherein there is electrical conductivity between the first terminal and the second terminal when the spacer is removed from in between the second end and the second terminal.

12. The thermal breaker of claim 11, wherein the spacer is in the shape of a wedge.

* * * * *